United States Patent [19]

Parr et al.

[11] 4,175,072
[45] Nov. 20, 1979

[54] LIGHT-COLORED UNSATURATED POLYESTER RESINS CONTAINING AT LEAST 2% BROMINE BY WEIGHT

[75] Inventors: Alan J. Parr, Bromborough; Bryan O. Brown, Upton-by-Chester, both of England

[73] Assignee: Freeman Chemical Corporation, Port Washington, Wis.

[21] Appl. No.: 909,009

[22] Filed: May 24, 1978

[30] Foreign Application Priority Data

Jul. 9, 1977 [GB] United Kingdom ............... 28882/77

[51] Int. Cl.$^2$ ....................... C08G 63/52; C08G 63/68
[52] U.S. Cl. .................................. 528/299; 528/297; 528/298; 528/303; 528/306
[58] Field of Search ............... 528/297, 298, 299, 303, 528/306

[56] References Cited

U.S. PATENT DOCUMENTS

| | | | |
|---|---|---|---|
| 3,546,176 | 12/1970 | Umfreville | 528/299 X |
| 3,585,254 | 6/1971 | Buck | 528/298 X |
| 3,640,964 | 2/1972 | Stewart et al. | 528/299 |
| 3,642,944 | 2/1972 | Abbott | 528/299 X |
| 3,784,500 | 1/1974 | Gibbons | 528/303 X |
| 3,891,605 | 6/1975 | Larsen et al. | 528/298 X |
| 3,937,756 | 2/1976 | Klein et al. | 528/299 X |

Primary Examiner—Lucille M. Phynes
Attorney, Agent, or Firm—Harry B. Keck; George E. Manias

[57] ABSTRACT

Light-colored unsaturated polyester resins containing at least 2% by weight bromine can be prepared by using at least a portion of the glycol ingredient dibromo neopentyl glycol and by using from 5 to 85 mol percent of tetrahydrophthalic acid or anhydride or endomethylene tetrahydrophthalic acid or anhydride.

1 Claim, No Drawings

LIGHT-COLORED UNSATURATED POLYESTER RESINS CONTAINING AT LEAST 2% BROMINE BY WEIGHT

BACKGROUND OF THE INVENTION

1. Field of the Invention

This invention relates to polyester resins and more particularly to a method for producing a light-colored unsaturated polyester resin containing at least 2% by weight of bromine by reacting polyols or alkylene oxides with polycarboxylic acids or anhydrides. Such bromine-containing unsaturated polyester resins exhibit improved fire resistance characteristics.

2. Description of the Prior Art

One means for introducing bromine into unsaturated polyester resins is to employ dibromo neopentyl glycol as one of the polyol ingredients of the resin. Typical unsaturated polyester resins which have employed dibromo neopentyl glycol in the past have exhibited darkened colors when fabricated in glasslined equipment and even darker colors when fabricated in stainless steel equipment. The objectionable color can be attenuated to some extent by dissolving the bromine-containing unsaturated polyester resin in, for example, styrene to form the usual polyester resin syrup. It is also known to add small quantities of an epoxide such as butylene oxide or epichlorohydrin to the resin syrup to lighten further the dark colored resin syrup. It has also been proposed to include triphenyl phosphite in the ingredients for the polyester reaction with a view to mitigating the dark color of the resultant resin.

SUMMARY OF THE INVENTION

According to the present invention there is provided a method for producing a light-colored unsaturated polyester resin containing at least 2% by weight of bromine by reaction between a polyol or alkylene oxide component and a polycarboxylic acid or anhydride component, characterized in that at least 5 mol percent of the polyol or alkylene oxide component is dibromo neopentyl glycol, that 5 to 85 mol percent of the polycarboxylic acid or anhydride component is tetrahydrophthalic acid or anhydride or endomethylene tetrahydrophthalic acid or anhydride, and that the polycarboxylic acid or anhydride component also contains at least 10 mol percent of an alpha-beta ethylenically unsaturated dicarboxylic acid or anhydride.

It is preferred to add the dibromo neopentyl glycol to a melt of the other components of the reaction mixture or to a precondensate from other components to ensure that the dibromo neopentyl glycol is not heated to a debromination or dehydrobromination temperature until the tetrahydrophthalic acid or anhydride or endomethylene tetrahydrophthalic acid or anhydride has been added to the reaction mixture.

The unsaturated polyester resin resulting from the method of the invention has a color which is lighter than the color of a corresponding unsaturated polyester resin which is not produced from a polyester reaction mixture containing tetrahydrophthalic acid or anhydride or endomethylene tetrahydrophthalic acid or anhydride.

DESCRIPTION OF THE PREFERRED EMBODIMENT(S)

The following examples are given by way of illustration.

EXAMPLE 1

A glass-lined kettle with stainless steel agitator was employed to produce an unsaturated polyester resin. The following ingredients were charged to the reaction kettle:

maleic anhydride—1,354 grams
tetrahydrophthalic anhydride—1,399 grams
triphenyl phosphite—9 grams
propylene glycol—350 grams These four ingredients were heated to 100° C. whereupon exothermic reaction occurred causing the temperature to rise to 125° C. The reaction kettle thereafter was cooled to about 100° C. The heating, exothermic reaction and cooling required about 2 hours.

To the reaction kettle at this stage was added:
dibromo neopentyl glycol—5,382 grams
hydroquinone—0.4 grams The reaction kettle was heated to 165° C. and held there for about 2 hours at which time 250 ml toluene was added and the reaction kettle was maintained at about 165° C. for an additional 6 hours to complete the polyesterification reaction. Thereafter the toluene solvent was stripped from the reaction kettle contents under vacuum and a polyester resin was received having a final acid value 45.6 and a viscosity (100% solids) of 6.8 poise at 150° C. The reaction kettle was cooled to 140° C. and the polyester was blended with 2,500 grams styrene and 1.1 grams of a solution containing 33% by weight toluhydroquinone in diethylene glycol. The mixture was cooled to 50° C. An additional 853 grams styrene and 5 grams epichlorohydrin was added to the resin syrup and the resulting product had the following properties as a polymerizable resin:

acid value—32.3
nonvolatile material—72.0 weight percent
viscosity—29.5 poise at 25° C.
SPI gel time—2.0 minutes
SPI time-to-peak—3.0 minutes
SPI peak exotherm—390° F.
color (Gardner-Holdt)—2–3

Prior attempts to produce unsaturated polyester resin syrups, (i.e. solutions of the polyester resins in styrene) employing dibromo neopentyl glycol as a polyol component—that is, attempts which did not include tetrahydrophalic acid or anhydride or endomethylene tetrahydrophthalic acid or anhydride—did not yield a product having a Gardner-Holdt color as low as 2–3.

EXAMPLE 2

The procedure of Example 1 was duplicated in a stainless steel kettle to produce 6,000 kilograms of the unsaturated polyester resin. The color of that resin was 2 on the Gardner-Holdt scale.

Commercially available materials sold as dibromo neopentyl glycol usually are mixtures containing dibromo neopentyl diol;
monobromo neopentyl triol; and
tribromo neopentyl alcohol.

The specific material employed in Examples 1 and 2 had the following composition:

dibromo neopentyl diol—80–82% by weight;
monobromo neopentyl triol—5–7% by weight;

tribromo neopentyl alcohol—13-15% by weight.

EXAMPLES 3-14

A series of comparative resins was prepared employing as the polycarboxylic acids
  maleic anhydride
  phthalic anhydride
  tetrahydrophthalic anhydride
  endomethylene tetrahydrophthalic anhydride
and as the polyol
  propylene glycol
  dipropylene glycol
  dibromo neopentyl glycol.

In all examples, the preparation was essentially the same, that is:

In a 10 liter glass reaction flask, equipped with a stainless steel stirrer, thermometer pocket, nitrogen inlet, Dean and Stark trap and water condenser, the following ingredients were charged:

The dicarboxylic acid anhydride and the glycols—other than the dibromo neopentyl glycol—and triphenyl phosphite. This mixture was heated gently and stirred to a temperature of 70° C. at which point a mild exotherm raised the temperature to about 110° C. Following the exotherm, the ingredients were further heated to about 120° C. for 1 hour. Thereupon, hydroquinone and dibromo neopentyl glycol were introduced into the flask along with toluene as a resin solvent. The temperature of the reaction mixture was increased to 160° C. in about 4 hours with the toluene employed as a reflux solvent. The water of esterification was removed continuously and collected in the Dean and Stark trap. The flask was maintained at 160° C. for 4 hours. The toluene was removed by vacuum stripping. The resin was blended with styrene and a solution of toluhydroquinone (33% by weight) in diethylene glycol solvent. The final acid value of the styrene solution of resin was measured.

The proportions of ingredients and the properties of the products are set forth in Table I.

The numbers in Table I for maleic anhydride, phthalic anhydride, propylene glycol, dipropylene glyol, tetrahydrophthalic anhydride, endomethylene tetrahydrophthalic anhydride and dibromo neopentyl glycol represent mols of those ingredients. The numbers for triphenyl phosphite, styrene, toluhydroquinone (33% by weight in diethylene glycol solution), hydroquinone represent grams. The numbers for toluene represent milliliters. The final acid value is reported as milligrams potassium hydroxide per gram of styrenated resin. The color values are reported on the Gardner-Holdt scale.

It will be observed that two different types of dibromo neopentyl glycol have been employed in the examples of the previous table. These two different types are identified as A and B. Type A was employed in Examples 3, 5, 7, 9, 11, 13 and 14; Type B was employed in Examples 4, 6, 8, 10 and 12. The difference between Type A and Type B dibromo neopentyl glycol is not known except that the Type A generally appears to produce lighter colored resins than the Type B dibromo neopentyl glycol.

The conclusions to be observed from Examples 3–14 are as follows: Light colored resins (having a Gardner-Holdt color of 2-3) can be obtained by employing at least 5 mol percent tetrahydrophthalic anhydride and the dibromo neopentyl glycol Type A (Examples 3, 5). When the same dibromo neopentyl glycol (Type A) is employed without any tetrahydrophthalic anhydride (Example 9) or with less than 5 mol percent (based upon the polycarboxylic acid ingredients) of tetrahydrophthalic anhydride (Example 7) the resulting color is 3–4. Similarly, the endomethylene tetrahydrophthalic anhydride can be employed with the Type A dibromo neopentyl glycol to produce a resin product having a Gardner-Holdt color of 2-3 (Example 11).

When the Type B dibromo neopentyl glycol is employed as an ingredient, in the absence of tetrahydrophthalic anhydride and in the absence of endomethylene tetrahydrophthalic anhydride (Example 10) the resulting Gardner-Holdt color is 10. The use of 2 mol percent tetrahydrophthalic anhydride reduces the Gardner-Holdt color of the same resin (Type B dibromo neopentyl glycol) to 7-8 (Example 8). Greater quantities of the tetrahydrophthalic anhydride (Examples 4, 6) further reduce the color of the resins made with Type B dibromo neopentyl glycol. Similarly, the use of endomethylene tetrahydrophthalic anhydride with the Type B dibromo neopentyl glycol achieves a color of 6 (Example 12).

Examples 13, 14 show color improvement resulting from tetrahydrophthalic anhydride (Example 13) compared to conventional resin (Example 14) wherein dipropylene glycol was employed in place of the propylene glycol of Examples 3–12, inclusive. A significant color reduction was achieved.

All of the resins produced in Examples 3–14 were polymerizable in the presence of 1% by weight benzoyl peroxide according to the SPI test method. Each of the resins produced a hardened thermoset product having a measurable Barcol hardness value.

TABLE I

| EXAMPLE | 3 | 4 | 5 | 6 | 7 | 8 | 9 | 10 | 11 | 12 | 13 | 14 |
|---|---|---|---|---|---|---|---|---|---|---|---|---|
| Maleic Anhydride | 13.8 | 13.8 | 13.8 | 13.8 | 13.8 | 13.8 | 13.8 | 13.8 | 13.8 | 13.8 | 10.0 | 10.0 |
| Phthalic Anhydride | — | — | 6.9 | 6.9 | 8.74 | 8.74 | 9.2 | 9.2 | 6.9 | 6.9 | — | 2.5 |
| Propylene Glycol | 5.4 | 5.4 | 5.4 | 5.4 | 5.4 | 5.4 | 5.4 | 5.4 | 5.4 | 5.4 | — | — |
| Dipropylene Glycol | — | — | — | — | — | — | — | — | — | — | 3.12 | 3.12 |
| T.H.P.A. | 9.2 | 9.2 | 2.3 | 2.3 | 0.46 | 0.46 | — | — | — | — | 2.5 | — |
| Endo-M.T.H.P.A. | — | — | — | — | — | — | — | — | 2.3 | 2.3 | — | — |
| Dibromo N.P.G. | 20.54 | 20.54 | 20.54 | 20.54 | 20.54 | 20.54 | 20.54 | 20.54 | 20.54 | 20.54 | 11.25 | 11.25 |
|  | (A) | (B) | (A) | (B) | (A) | (B) | (A) | (B) | (A) | (B) | (A) | (A) |
| Triphenyl Phosphite | 9.0 | 9.0 | 9.0 | 9.0 | 9.0 | 9.0 | 9.0 | 9.0 | 9.0 | 9.0 | 4.5 | 4.5 |
| Styrene | 2200 | 2200 | 2200 | 2200 | 2200 | 2200 | 2200 | 2200 | 2200 | 2200 | 1123 | 1123 |
| Toluhydroquinone | 1.1 | 1.1 | 1.1 | 1.1 | 1.1 | 1.1 | 1.1 | 1.1 | 1.1 | 1.1 | 0.55 | 0.55 |
| Hydroquinone | 0.4 | 0.4 | 0.4 | 0.4 | 0.4 | 0.4 | 0.4 | 0.4 | 0.4 | 0.4 | 0.2 | 0.2 |
| Toluene | 250 | 250 | 250 | 250 | 250 | 250 | 250 | 250 | 250 | 250 | 125 | 125 |
| Final Acid Value | 32 | 34 | 32.6 | 33.4 | 33.5 | 29.5 | 33.4 | 33.5 | 31.7 | 32.7 | 27.6 | 24.4 |

TABLE I-continued

| EXAMPLE | 3 | 4 | 5 | 6 | 7 | 8 | 9 | 10 | 11 | 12 | 13 | 14 |
|---|---|---|---|---|---|---|---|---|---|---|---|---|
| Color, G-H | 3 | 6 | 2-3 | 5-6 | 3-4 | 7-8 | 3-4 | 10 | 2-3 | 6 | 3-4 | 6 |

NOTES:
T.H.P.A. = Tetrahydrophthalic anhydride
Endo-M.T.H.P.A. = Endomethylene tetrahydrophthalic anhydride
Dibromo N.P.G. = Dibromo neopentyl glycol

We claim:

1. A method for producing a light-colored unsaturated polyester resin containing at least 2% by weight bromine from polyols or alkylene oxides and polycarboxylic acids or anhydrides wherein at least 5 mol percent of the polyol ingredient is dibromo neopentyl glycol and wherein from 5 to 85 mol percent of the polycarboxylic acid or anhydride is tetrahydrophthalic acid or anhydride or endomethylene tetrahydrophthalic acid or anhydride and wherein the polycarboxylic acid or anhydride also contains at least 10 mol percent of alpha-beta ethylenically unsaturated dicarboxylic acid or anhydride to yield an unsaturated polyester resin having a color which is lighter than the color of a corresponding unsaturated polyester resin which does not contain the tetrahydrophthalic acid or anhydride or endomethylene tetrahydrophthalic acid or anhydride.

* * * * *